United States Patent
Mahnad

(10) Patent No.: US 10,276,206 B2
(45) Date of Patent: Apr. 30, 2019

(54) STORAGE TAPE WOBBLE DECODER AND METHOD

(71) Applicant: Oracle International Corporation, Redwood City, CA (US)

(72) Inventor: Faramarz Mahnad, Brookline, MA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 15/268,013

(22) Filed: Sep. 16, 2016

(65) Prior Publication Data

US 2018/0082712 A1   Mar. 22, 2018

(51) Int. Cl.
| | |
|---|---|
| *G11B 7/005* | (2006.01) |
| *G11B 20/10* | (2006.01) |
| *G11B 7/007* | (2006.01) |
| *G11B 7/003* | (2006.01) |

(52) U.S. Cl.
CPC ...... *G11B 20/10046* (2013.01); *G11B 7/0053* (2013.01); *G11B 7/003* (2013.01); *G11B 7/00718* (2013.01)

(58) Field of Classification Search
None
See application file for complete search history.

(56) References Cited

U.S. PATENT DOCUMENTS

2014/0086029 A1*  3/2014  Mahnad ........... G11B 20/10194
                                                    369/44.13

* cited by examiner

*Primary Examiner* — Brian M Butcher
(74) *Attorney, Agent, or Firm* — Invoke

(57) ABSTRACT

Amplitude or phase modulated uncompensated wobble patterns representing address patterns for track addresses of optical media are generated or applied to the media. A filter is applied to the un-compensated wobble patterns to detect a threshold value to signal the existence of a synchronization pattern. A pair of filters can be used to detect the threshold and a zero-crossing. This methodology can detect the existence and timing of the wobble pattern. This can eliminate the need for a timing recovery subfield in the wobble pattern of the prior art.

18 Claims, 11 Drawing Sheets

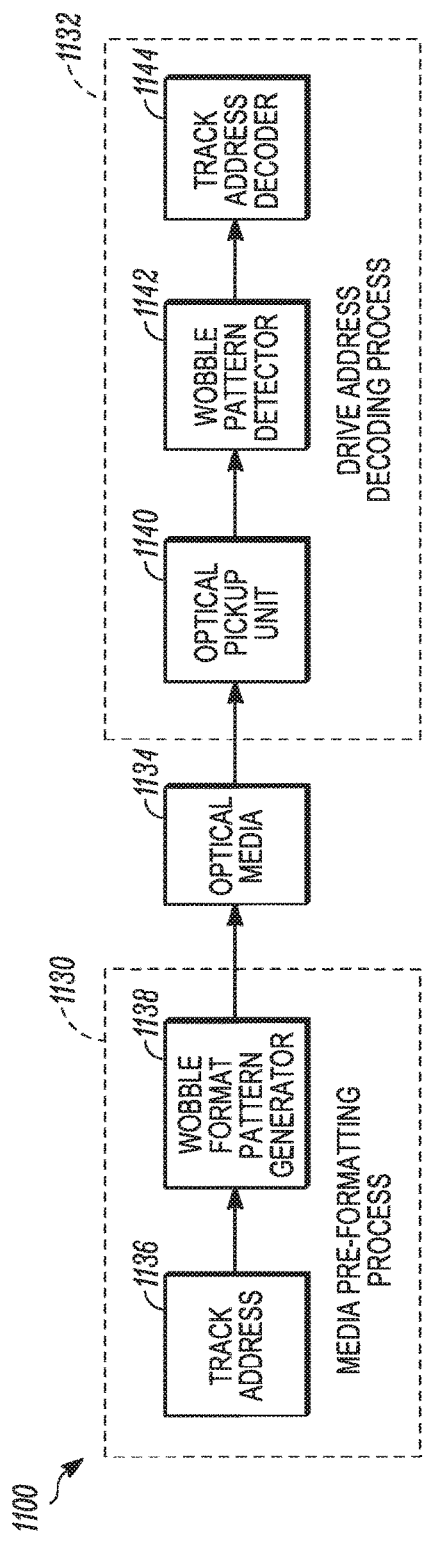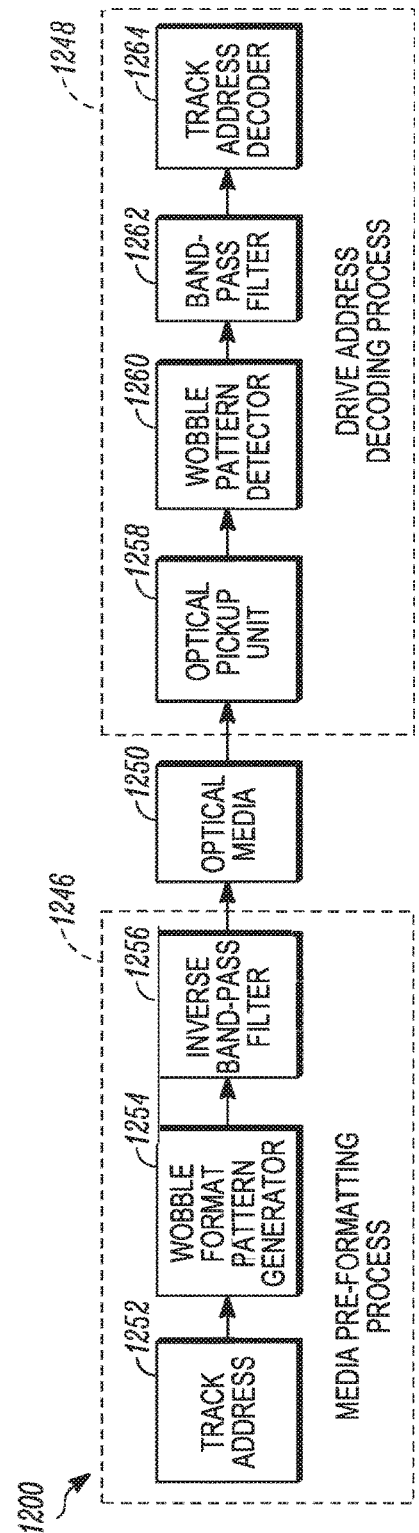

STORAGE TAPE WOBBLE DECODER AND METHOD

TECHNICAL FIELD

This disclosure relates to the field of optical storage tape, and, in particular, focuses on structures and methods for wobble pattern detection.

BACKGROUND

Preformatting an optical media with wobbled edge land and groove tracks is an effective method for embedding recording track addresses on the media. Wobble pattern blocks are normally a sequence of frequency, amplitude or phase modulated sine waves and are utilized as building blocks for a complete address field of the media recording tracks. These address fields usually include an index subfield (IF), a timing recovery subfield (TRF) and an address bits subfield (AF).

U.S. Pat. No. 9,165,598 describes amplitude or phase modulated un-compensated wobble patterns representing address patterns for track addresses of optical media are generated. A filter is applied to the un-compensated wobble patterns to pre-compensate the un-compensated wobble patterns. When an inverse of the filter is applied to a signal representing the pre-compensated wobble patterns in the presence of noise, the noise is suppressed and the un-compensated wobble patterns are substantially recovered.

SUMMARY

A method for decoding or encoding a wobble pattern on an optical media is described. The wobble pattern need not use a timing recovery field. An example method can include generating a wobble pattern signal representing address patterns for track addresses of the optical media, applying a matched filter to the wobble pattern signal to generate a detection signal when the wobble pattern is detected by the matched filter, and detecting a threshold of the detection signal to indicate a beginning of an address field.

In an example, generating the wobble pattern signal includes generating a signal including dual cycle wobble blocks.

In an example, the dual cycle wobble blocks include a sync field, and an address field following the sync field.

In an example, the wobble pattern signal is stored in a wobble physical nanostructure track that is small compared to a land and groove structure of the media.

In an example, the wobble pattern signal is free from a timing recovery signal.

In an example, applying the matched filter includes applying a sync sine matched filter to the wobble pattern signal.

In an example, the sync sine matched filter includes taps with coefficients to match a desired wobble pattern.

In an example, applying the matched filter includes applying a sync cosine matched filter to the wobble pattern signal to output a signal to a zero crossing detector and detecting a zero crossing threshold, which will cross the zero crossing threshold at a maximum of the detection signal.

In an example, the sync sine matched filter includes sine taps with coefficients to match a desired wobble pattern and wherein the sync cosine matched filter includes cosine taps with coefficients to match a desired wobble pattern such that the sync sine matched filter and the sync cosine matched filter provide precise timing of a sync timing with respect to an address bits pattern in the address field free of a timing recover subfield.

In an example, the wobble pattern includes a carrier frequency and wherein the filter is centered at the carrier frequency.

In an example, the wobble pattern includes dual cycle phase shifted wobbles representing sync field and being free of a timing recovery field.

In an example, the wobble patterns include dual cycle wobbles representing address bits sub-fields and being free of a timing recovery sub-field.

An optical tape data storage system is described that may perform the methods described herein. In an example, the system may include a tape head to read a wobble pattern signal on an optical tape and a decoder configured to receive the wobble pattern signal of an optical storage tape, filter the wobble pattern signal using a sync sine matched filter to output a first detected signal that crosses a first threshold to identify a timing and a sync cosine filter to output a second detected signal that crossed a second threshold to further identify the timing without a timing recover signal being present in the wobble pattern.

In an example, the decoder is further configured to identify an address index and identify a predetermined pattern of bits trailing the address index.

In an example, the sync sine matched filter operates by a plurality of taps executing an equation of $a_0 + a_1 n - 1 + a_2 n - 2 + \ldots a_{39} n - 39(W(n))$, where: $ax = [-3\ -6\ -8\ -9.5\ -10\ -9.5\ -8\ -6\ -3\ 0\ 3\ 6\ 8\ 9.5\ 10\ 9.5\ 8\ 6\ 3\ 0\ 3\ 6\ 8\ 9.5\ 10\ 9.5\ 8\ 6\ 3\ 0\ -3\ -6\ -8\ -9.5\ -10\ -9.5\ -8\ -6\ -3\ 0]$.

In an example, the sync cosine matched filter operates by a plurality of taps executing an equation of $a_0 + a_1 n - 1 + a_2 n - 2 + \ldots a_{39} n - 39(W(n))$, where: $ax = -[-9.5\ -8\ -6\ -3\ 0\ 3\ 6\ 8\ 9.5\ 10\ 9.5\ 8\ 6\ 3\ 0\ -3\ -6\ -8\ -9.5\ -10\ 10\ 9.5\ 8\ 6\ 3\ 0\ -3\ -6\ -8\ -9.5\ -10\ -9.5\ -8]$.

In an example, the tape head reads the wobble pattern signal off a wobble physical nanostructure track and data off a land and groove track, wherein the wobble physical nanostructure track is small compared to the land and groove track.

In an example, the decoder is configured to generate the wobble pattern signal including dual cycle wobble blocks, which include a sync field and an address field following the sync field.

An optical media encoding system is described and may include a tape head to write a wobble pattern signal on an optical tape and an encoder configured to write the wobble pattern signal to an optical storage tape with a dual pattern wobble signal that is matched to a sync sine matched filter to read a first detected signal that crosses a first threshold to identify a timing and matched to a sync cosine filter to read a second detected signal that crosses a second threshold.

In an example, the tape head writes the wobble pattern signal to a wobble physical nanostructure track and data to a land and groove track, wherein the wobble physical nanostructure track is small compared to the land and groove track; and wherein the encoder is configured to generate the wobble pattern signal free of a timing recovery field and including dual cycle wobble blocks, which include a sync field, monotone cycle fields around the sync field, and an address field following the monotone cycle fields.

BRIEF DESCRIPTION OF THE DRAWINGS

FIG. 11 shows a block diagram of signal processing system according to an example embodiment.

FIG. 12 shows a block diagram of signal processing system according to an example embodiment.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
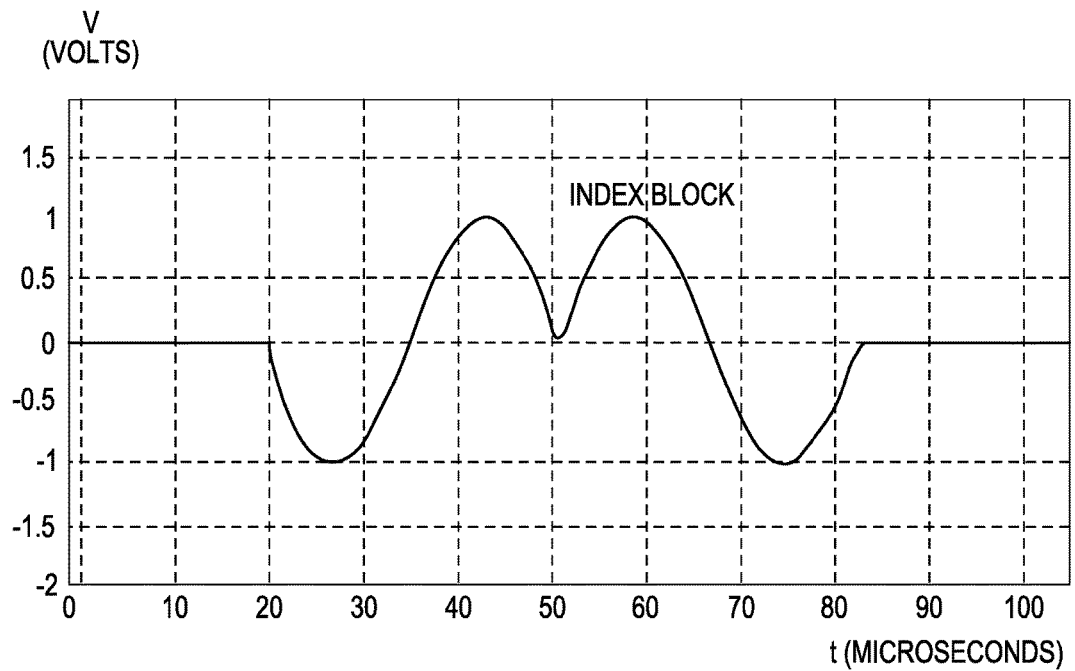
FIG. 1 shows an index block waveform.
Figure 2:
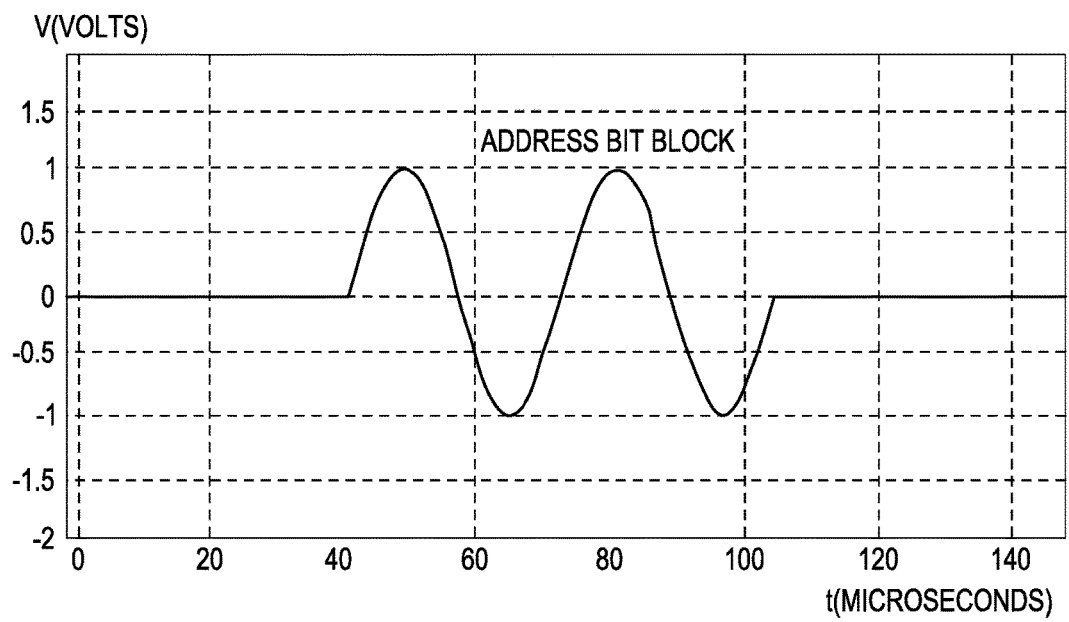
FIG. 2 shows an address bit block waveform.
Figure 3:
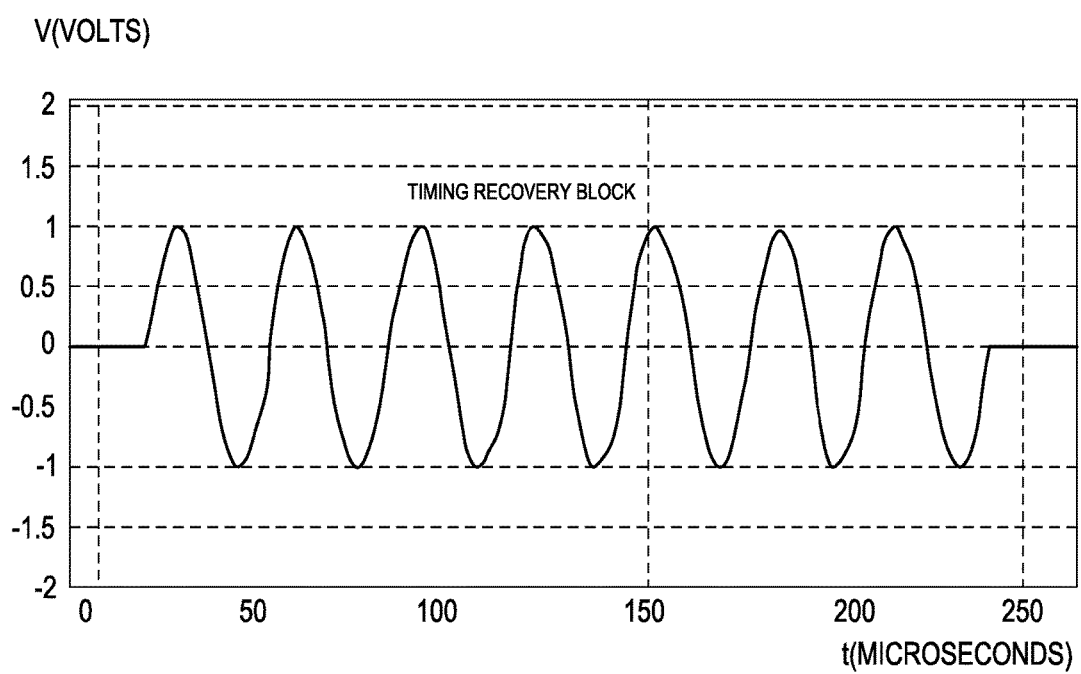
FIG. 3 shows a timing recovery block waveform.
Figure 4:
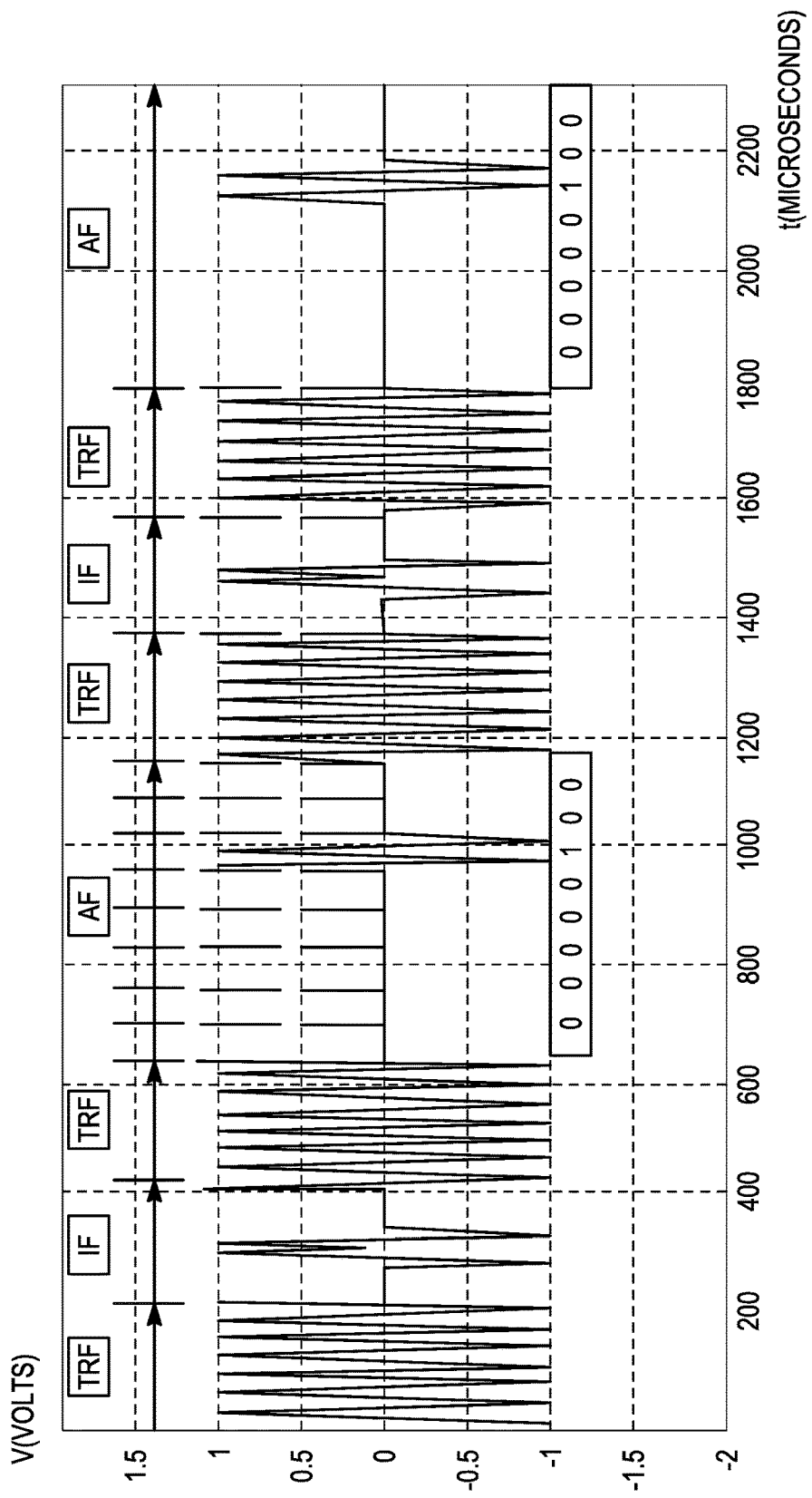
FIG. 4 shows an address pattern waveform including the blocks of FIGS. 1 through 3.

Referring to FIGS. 1 through 4, dual cycle wobble block patterns, such as the index block of FIG. 1, the address bit block of FIG. 2, and the timing recovery block of FIG. 3, have been implemented as example foundational elements of an address field pattern, such as the pattern of FIG. 4, for optical tape media. Phase modulated dual cycle blocks, in this example, represent the index or sync field (IF), and the eight subsequent pairs of cycles represent the eight bits of the address field (AF). Known systems include a timing recover field around the index fields for timing recovery in a decoder, e.g., as shown in FIG. 3. Pre-formatting the optical media with "wobbled edge" land and groove track structures is an effective method of embedding the recording track addresses on the tape media. These structural wobble patterns are normally a sequence of multiple sine wave blocks which are frequency, amplitude or phase modulated and which are utilized as building blocks for a complete address field of the media recording tracks. These address fields, at minimum, must include with-in them, an index subfield (SF) and an address bits subfield (AF) in the present disclosure. Prior known address fields must include a timing recovery subfield (TRF). The dual cycle bobble block patterns shown in FIGS. 1-4 have been proposed and implemented by the present inventor as the elements of the address field pattern for optical tape media. In this pattern, the phase modulated duel cycles bock indicates the index field (i.e., sync field) a set of monotone cycles fields around the index fields are for the eight subsequent pairs of cycles are for the eight bits of the address field.

A decoder operating on the signals of FIGS. 1-4 can include a filter, which can include at least one of a finite impulse response filter, a delay filter, or a delay buffer, which generates a half cycle delayed pattern of the original pattern. The decoder can add the two patterns to establish a significant and easily detectable sync half cycle (index). The decoder detects by a finite impulse response filter with a threshold comparator the sync half cycle. Once the index cycle is detected, the decoder determines the beginning of the address field and establishes the timing of each bit of the address subfield and decodes the address. It is, however, clearly noted here that robustness and efficiency of track address coding and decoding scheme is desired for reliable data recording and retrieval process. Wobble patterns in optical recording systems, on the other hand, are notoriously susceptible to media noise and pre-formatting process imperfections. This is due to the fact the amplitude of the wobble physical nanostructure is inherently small compared to land and groove structure, due to the limitation imposed by the read write channel ISI requirements and also adjacent track's wobble interference effect. Using the impulse response filter, which can include a sync sine matched filter or a sync cosine impulse matched filter, or both, allows the decoder to detect the timing and the address without the timing recovery fields.

Examples of the present disclosure use filters to sample the wobble pattern signal. In an example, the filters are matched. In an example, the filters can include a class of finite impulse response (FIR) filters that are used to detect a specific pattern from input signals applied to the filters. The coefficients of the taps of these filters replicate the targeted pattern normalized-values at the sample time of the filter. Other details of filter systems are described in U.S. Pat. No. 9,165,598, which is hereby incorporated by reference. If the documents incorporated by reference conflict with the present disclosure, the present disclosure controls.

Figure 5:
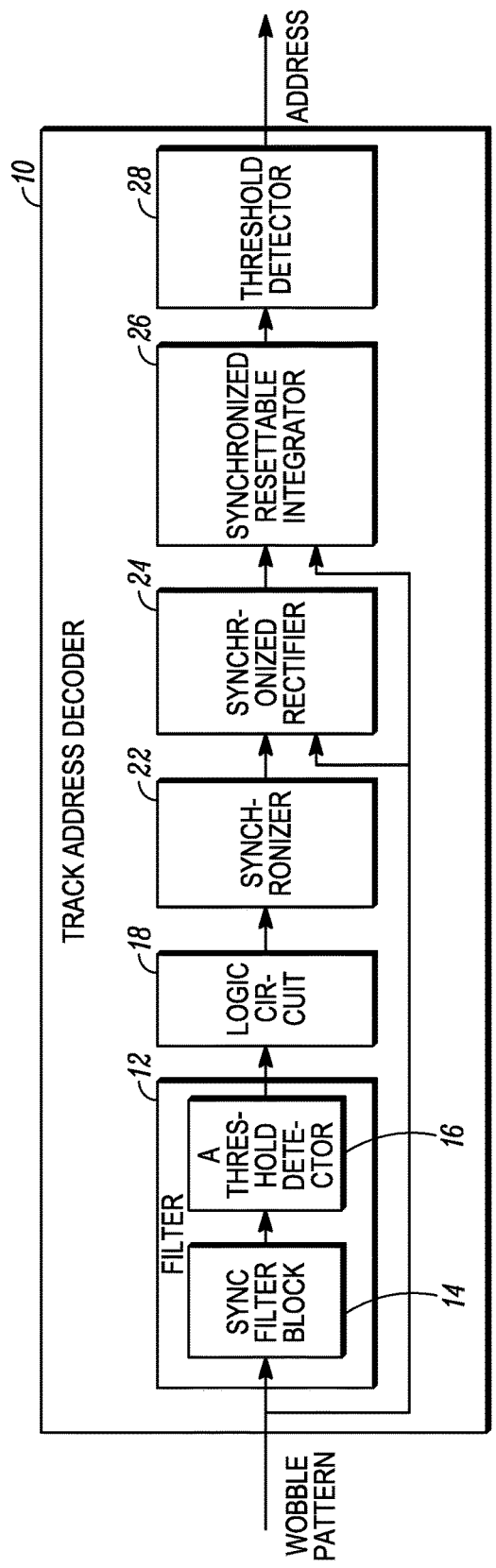
FIG. 5 shows a block diagram of a track address decoder.
Figure 6:
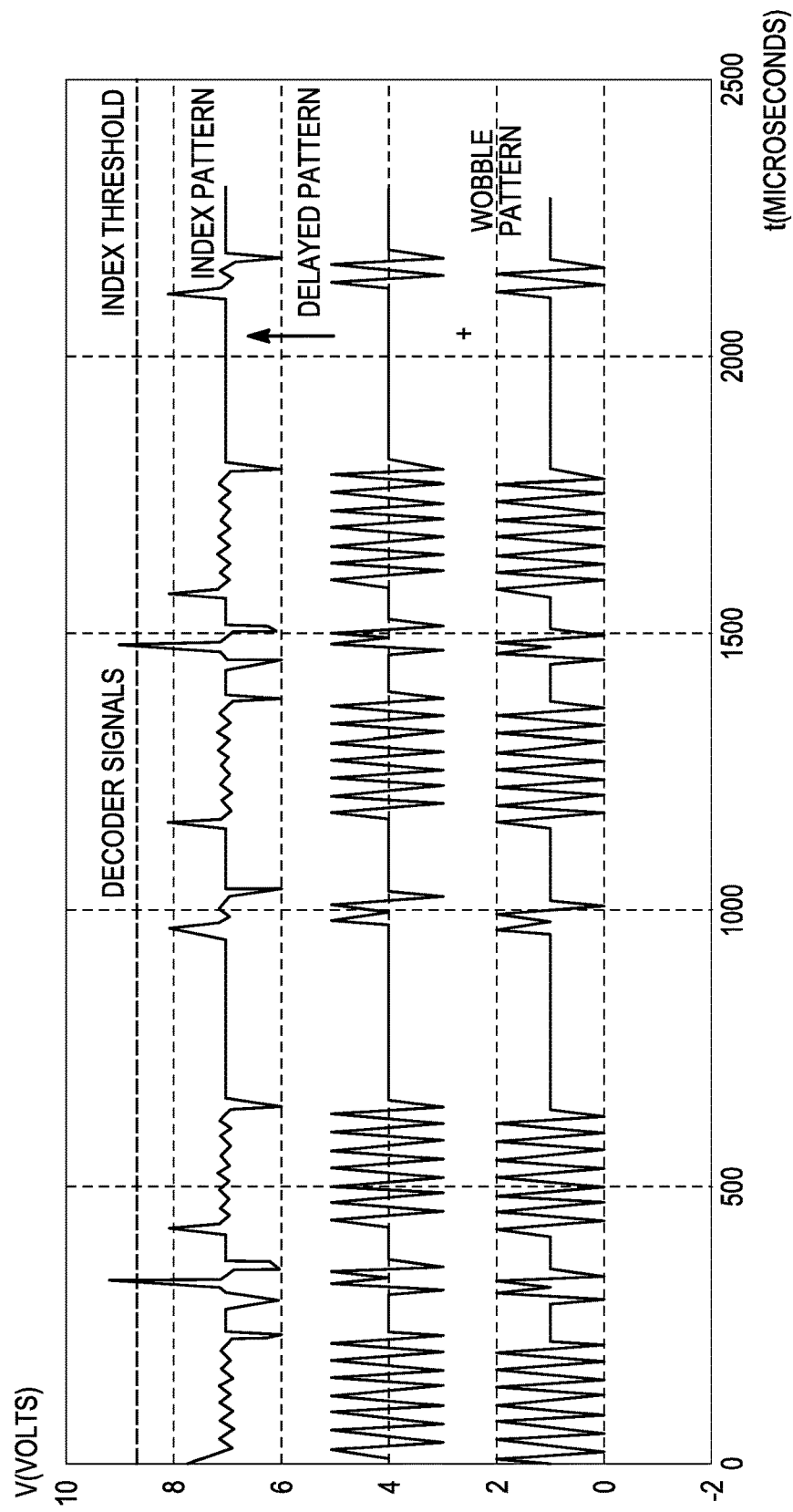
FIG. 6 shows a wobble pattern waveform added to a delayed version of itself, and the resulting index pattern waveform.

Referring to FIGS. 5 and 6, a track address decoder 10 may include a filter 12, logic circuit 18, synchronizer 22, synchronized rectifier 24, synchronized resettable integrator 26 and threshold detector 28. The filter 12 may include a sync filter block 14 and a threshold detector 16. A wobble pattern, such as the wobble pattern of FIG. 6, can be input to the sync filter block 14 and a threshold detector 16. The resulting output of the sync filter block 14 can also be input to the threshold detector block 16. The resulting output of the threshold detector 16 can be input to the logic circuit 18. An output of the logic circuit 18 can be input to the synchronizer 22. An output of the synchronizer 22 and the wobble pattern of FIG. 6 can be input to the synchronized rectifier 24. The resulting output of the synchronized rectifier 24 can be input to the synchronized resettable integrator 26. The resulting output of the synchronized resettable integrator 26 can be input to another threshold detector 28. In this arrangement, an output of the threshold detector 28 yields the address associated with the wobble pattern.

The sync filter 12 generates signal(s) establishes the timing of each bit of the address subfield and the address is decoded via the synchronizer 22, synchronized rectifier 24, synchronized resettable integrator 26 and threshold detector 28 as known in the art.

A robust and efficient track address coding/decoding scheme may be useful to a reliable data recoding and retrieval process as wobble patterns in optical recording systems can be susceptible to media noise and pre-formatting process imperfections. This susceptibility is due to the fact that the amplitude of physical wobble nanostructures is relatively small compared to the land and groove structures, which is caused by limitations imposed by read/write channel Inter-Symbol Interference. Hence, disclosed herein are wobble coding, pre-compensating and decoding technologies that can improve, in certain examples, effective signal-to-noise ratio (SNR) of wobble signal patterns. Using the index block with a sync sine matched filter or both a sync sine matched filter and a sync cosine matched filter allows the wobble signal timing to be reliably established absent the timing recovery signals.

Figure 7:
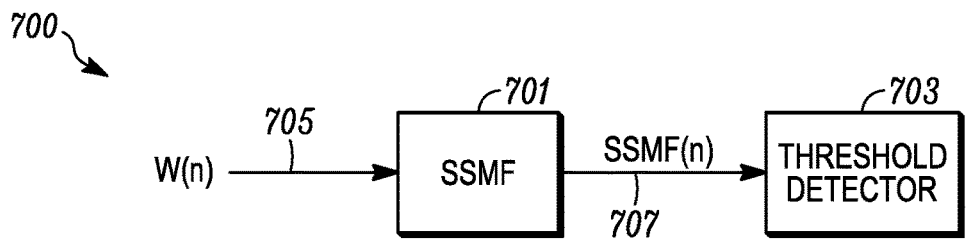
FIG. 7 shows a schematic view of a filter scheme according to an example embodiment.
Figure 8:
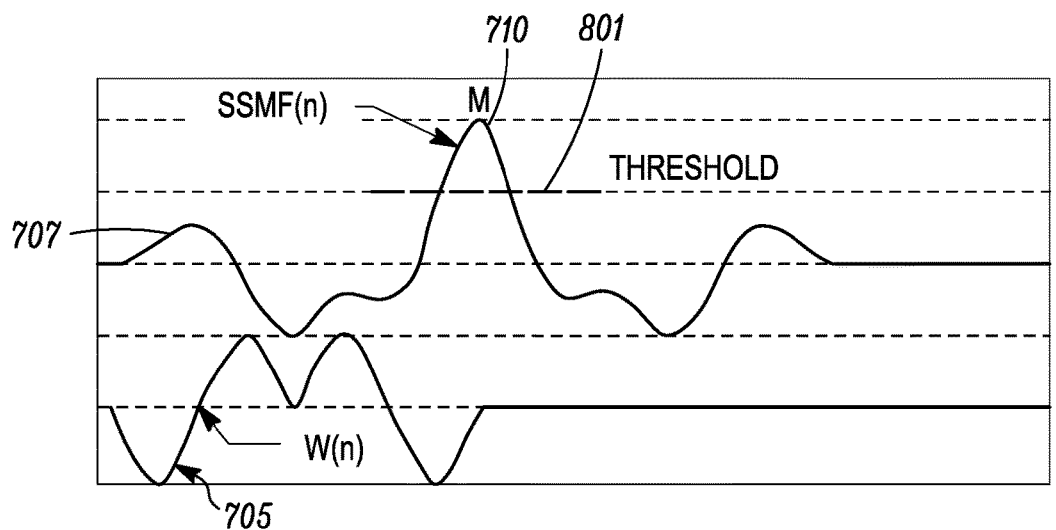
FIG. 8 shows signals for the FIG. 7 filter scheme according to an example embodiment.

FIG. 7 shows a schematic view of a filter scheme 700 including a filter 701 and a threshold detector 703. The filter 701 can be a Sync Sine Matched FIR (SSMF) that receives the input signal 705 detected from the wobble pattern on the media. The input signal may be the signal shown in FIG. 1. The output signal, SSMF(n), 707 from the filter 701 is input into the threshold detector 703. The threshold detector 703 outputs a signal when its input signal 707 passes a threshold, e.g., threshold 801 as shown in FIG. 8. FIG. 8 shows the signals used in the filter scheme 700. The input signal 705 is the wobble pattern, here shown as the wobble pattern signal of FIG. 1. The output signal 707 from the filter 701 is below the threshold until the filter detects the pattern in the input signal 705. Then, the output from the filter 701 may cross the threshold 801. The threshold detector 703 detects the crossing of the threshold 801 and may provide the sync pattern or timing.

The filter 701 can include matched filters, e.g., a class of finite impulse response (FIR) filters that detect a specific pattern from their input signals. The coefficients of taps of these filters replicate the targeted pattern normalized-values at the sample time of the filter. In an example, there are between 20 and fifty coefficients of taps in the filter. For example in the proposed decoder to detect a pattern of sync symbol as shown in FIG. 1, a forty tap Sync Sine Matched FIR (SSMF) filter of equation E1 may be used.

$$\text{SSMF}(n)=a[0]*W(n)+a[1]*W(n-1)+a[2]*W(n-2)+\ldots a[39]*W(n-39)=\Sigma_{x=0}^{39}a[x]W(n-x) \quad \text{E1}$$

where: a=[−3 −6 −8 −9.5 −10 −9.5 −8 −6 −3 0 3 6 8 9.5 10 9.5 8 6 3 0 3 6 8 9.5 10 9.5 8 6 3 0 −3 −6 −8 −9.5 −10 −9.5 −8 −6 −3 0], W(n) is an input signal to the sync sine matched filter, SSMF(n) is an output signal of the sync sine matched filter, and n is a sample index.

Figure 9:
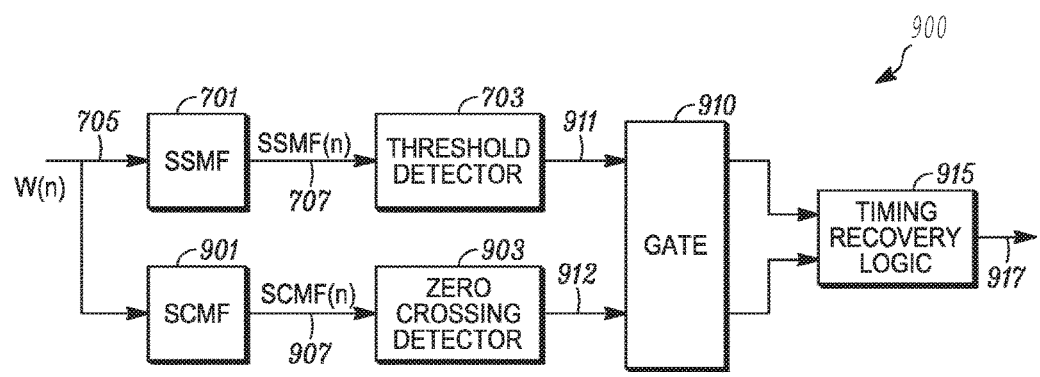
FIG. 9 shows a schematic view of a filter scheme according to an example embodiment.
Figure 10:
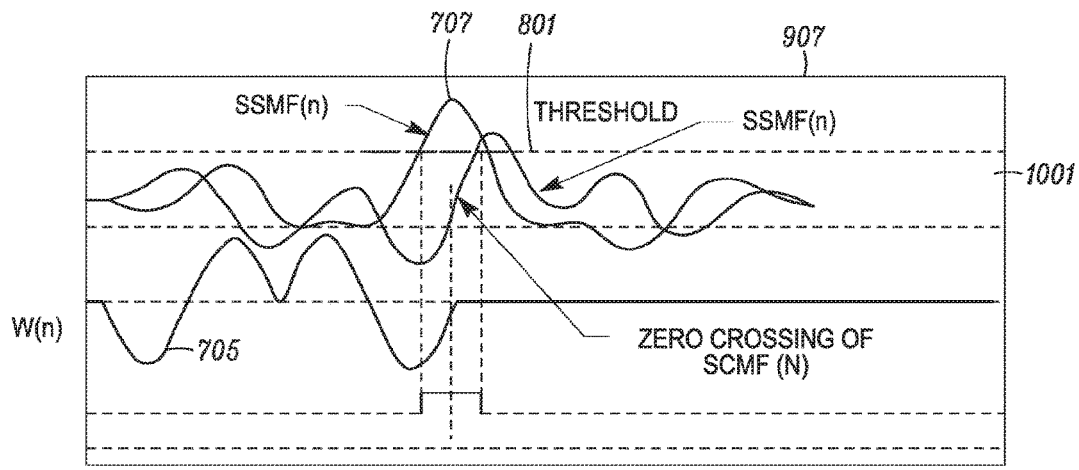
FIG. 10 shows signals for the FIG. 9 filter scheme according to an example embodiment.

FIG. 9 shows an embodiment of a filter scheme 900 that includes the threshold detector scheme 700 and a further filer processing scheme. The detected input signal 705 is input into a filter 901, which can be a Sync Cosine Matched FIR (SCMF) that receives the input signal 705 detected from the wobble pattern on the media. The input signal may be the signal shown in FIG. 1. The output signal, SSCF(n), 907 from the filter 901 is input into a zero crossing detector 903. The zero crossing detector 903 outputs a signal when its input signal 907 crossing the zero line, e.g., the zero line 1001 as shown in FIG. 10. In an example, there are between twenty and fifty coefficients of taps in the filter. FIG. 10 shows the signals used in the filter scheme 900 with forty coefficients of taps.

$$\text{SCMF}(n)=a[0]*W(n)+a[1]*W(n-1)+a[2]*W(n-2)+\ldots a[39]*W(n-39)=\Sigma_{x=0}^{39}a[x]W(n-x) \quad \text{E2}$$

where: a=−[−9.5 −8 −6 −3 0 3 6 8 9.5 10 9.5 8 6 3 0 −3 −6 −8 −9.5 −10 10 9.5 8 6 3 0 −3 −6 −8 −9.5 −10 −9.5 −8], W(n) is an input signal to the sync cosine matched filter, SCMF(n) is an output signal of the sync cosine matched filter, and n is a sample index.

The wobble signal 705 feeds to both the filter 701 and the filter 901. The output of the filter 901 peaks after the output of the filter 701. The output of the filter 701 peaks greater than the output of the filter 901. The threshold 801 is set at a level higher than the crossing threshold 1001. In an example, the zero crossing threshold 1001 is at the zero level. However, in some examples, the crossing threshold 1001 may be set at a level above zero and below the threshold 801. As shown in FIG. 10, the filter 901 has an output (SCMF(n)) 907 that crosses the zero crossing threshold 1001 exactly at the peak amplitude 710 of the output signal 707 (SSMF (n)) generated by the filter 701.

The filter 701 and the filter 901 together provide a gated zero crossing detection logic, which is represented by the output signals 911, 912 being fed through a gate 910 to timing recovery logic 915. The logic 915 can use the signals 911, 912 at gate 910 to detect accurately the sync pattern at the beginning of an address field and the precise timing of sync pattern with respect to the address bits pattern. The output 917 from the logic 915 can be used for system decoding phase lock loop (PLL), which gates the address bit patterns of the address field. The present scheme can eliminate the need for Timing Recover Subfield (TRF) of prior art and improving the efficiency of the Wobble track address pattern and methodology.

Each of the filters 701 and 901 may include a sample delay circuit that feeds the input signal W(n) to the circuitry that applies the sample tap coefficients. A summing circuit can receive outputs from each sample tap coefficient circuit to sum the results and produce the output signal, either SSMF(n) or SCMF(n).

FIG. 11 shows a signal processing block diagram 1100 with a media pre-formatting process 1130 and drive address decoding process 1132 for an optical media 1134. During the pre-formatting process 1130, track address information 1136 is input to a wobble format pattern generator 1138 to pre-format the optical media 1134. Preformatting may include applying the wobble pattern before data is stored on the optical media. During the drive address decoding process 1132, an optical pickup unit 1140 reads data from the optical media 1134. The data then is input to a wobble pattern detector 1142 and track address decoder 1144. As mentioned above however, the drive address decoding process 1132 may be hampered by excessive noise associated with the signal.

FIG. 12 shows an example of an improved signal processing block diagram 1200 including a media pre-formatting process 1246 and drive address decoding process 1248 for an optical media 1250. During the pre-formatting process 1246, track address information 1252 is input to a wobble format pattern generator 1254, which generates, in certain examples, amplitude and phase modulated un-compensated wobble patterns representing address patterns for track addresses of the optical media 1250. An inverse BP filter 1256 is applied to pre-compensate the un-compensated wobble patterns. The pre-compensated wobble patterns are then embossed on the optical media 1250. The filter systems 700, 900, as described herein, can be used to detect the wobble patterns, e.g., without the timing recovery field of prior methodologies.

During the drive address decoding process 1248, an optical pickup unit 1258 reads data from the optical media 1250. The data is then input to a wobble pattern detector 1260, a BP filter 1262 and track address decoder 1264. Application of the BP filter 1262, however, does not change the shape of the wobble patterns in such a way so as to make them unrecognizable to the track address decoder 1264 because the inverse BP filter 1256 pre-compensated the wobble patterns to account for shape altering effects associated with the application of the BP filter 1262.

Figure 13:
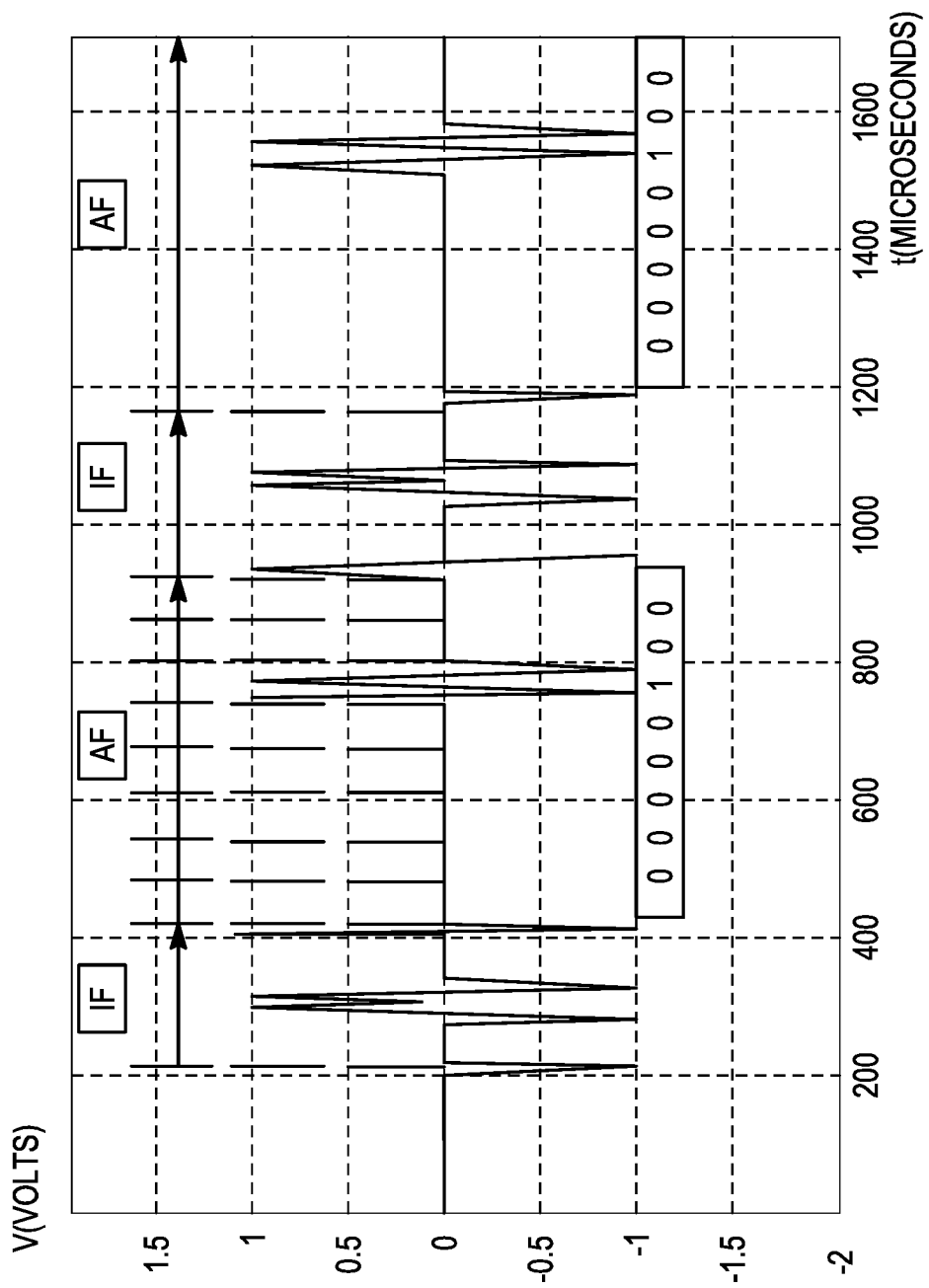
FIG. 13 shows an address pattern waveform according to an example embodiment.

FIG. 13 shows an address pattern waveform according to an example embodiment with an index field and an address field.

Figure 14:
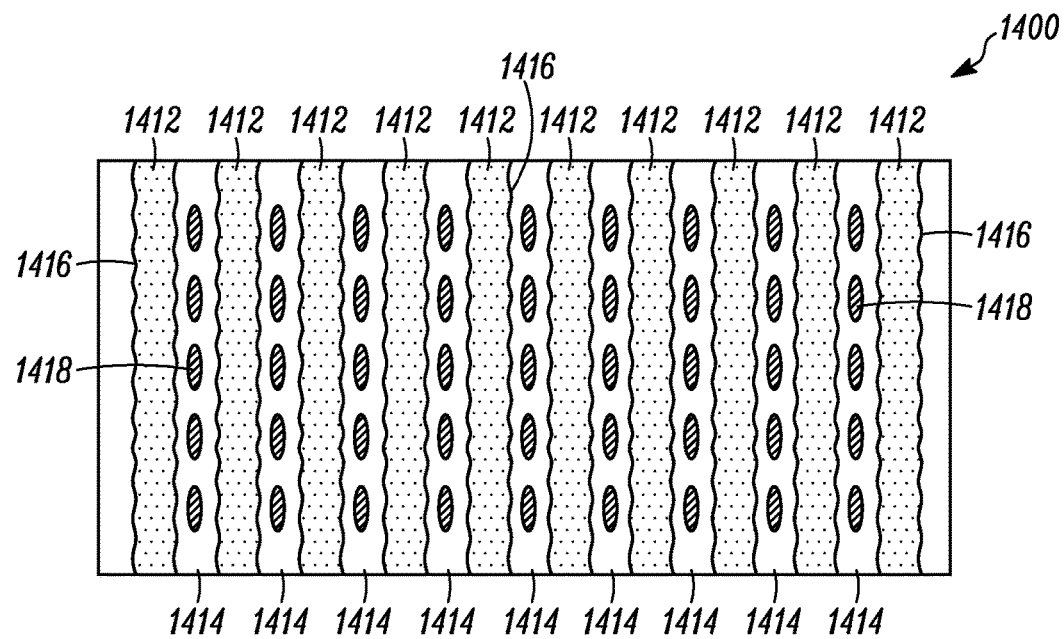
FIG. 14 illustrates a plan view of a portion of an optical recording medium.
Figure 15:
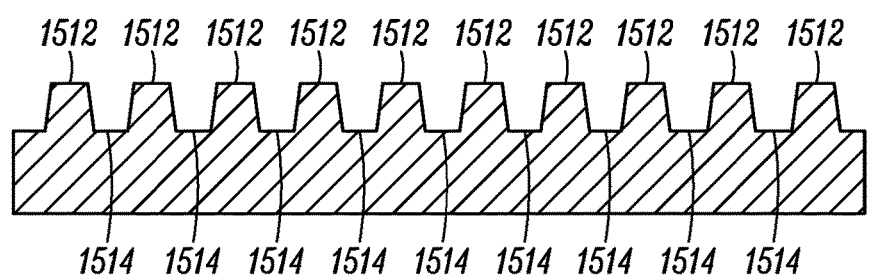
FIG. 15 illustrates a cross sectional view of a portion of the typical optical recording medium.

The present description can be part of servo systems in optical data recording devices such as optical tape drives, which utilize tracking error signals, detected from the optical media via an optical pickup unit (OPU) device, to accurately record and then retrieve data on the optical media. FIGS. 14 and 15 illustrate a portion of a typical optical recording medium. FIG. 14 is a plan view. FIG. 15 is an end view. Optical data storage medium 1400 includes a nanostructure surface relief pattern embossed on the surface of the optical data storage medium 1400. The nanostructure includes lands 1412 and grooves 1414 embossed in the Z direction (i.e., parallel to the face of optical data storage medium 1400) thereon in a preformatting process. These surface relief patterns are used to generate the tracking signals used by a servo system to track the position of an optical head reading or writing to the optical data storage medium 1400. An optical drive (OPU) with the aid of electronic signal processing generates a tracking error signal (TES) from the detected patterns. In order to establish an addressing capability for these recording tracks, the edges of these embossed lands 1412 and grooves 1414 relief patterns are structurally modulated in the horizontal directions parallel to the face of optical data storage medium 1400 (e.g., Y axes to track X axes) with sinusoidal patterns 1416 (i.e., wobbles) which contain individual track address codes. These wobble patterns embedded (or embossed) on the surface of optical data storage media such as optical tape, during media preformatting process, and thereafter detected by the optical read element during normal operation of the data storage devices are the essential part of reliable data recording and retrieval functionality of the these devices. FIG. 14 also depicts recording marks 1418 encoded thereon.

A technique referred to as "Radial Push Pull" Tracking signal generation (also referred to as "Main Push Pull" (MPP)), have been conventionally used to generate the Tracking Error Signal (TES) for the rewritable optical recording media preformatted with "land" and "groove" track geometries as set forth above. This scheme generates a reference tracking signal based on the geometries of land and grooved tracks on the media and detectable by a main quad photodetector (QPD) of the OPU. A signal processing scheme for the TES signal generated by the QPD.

Figure 16:
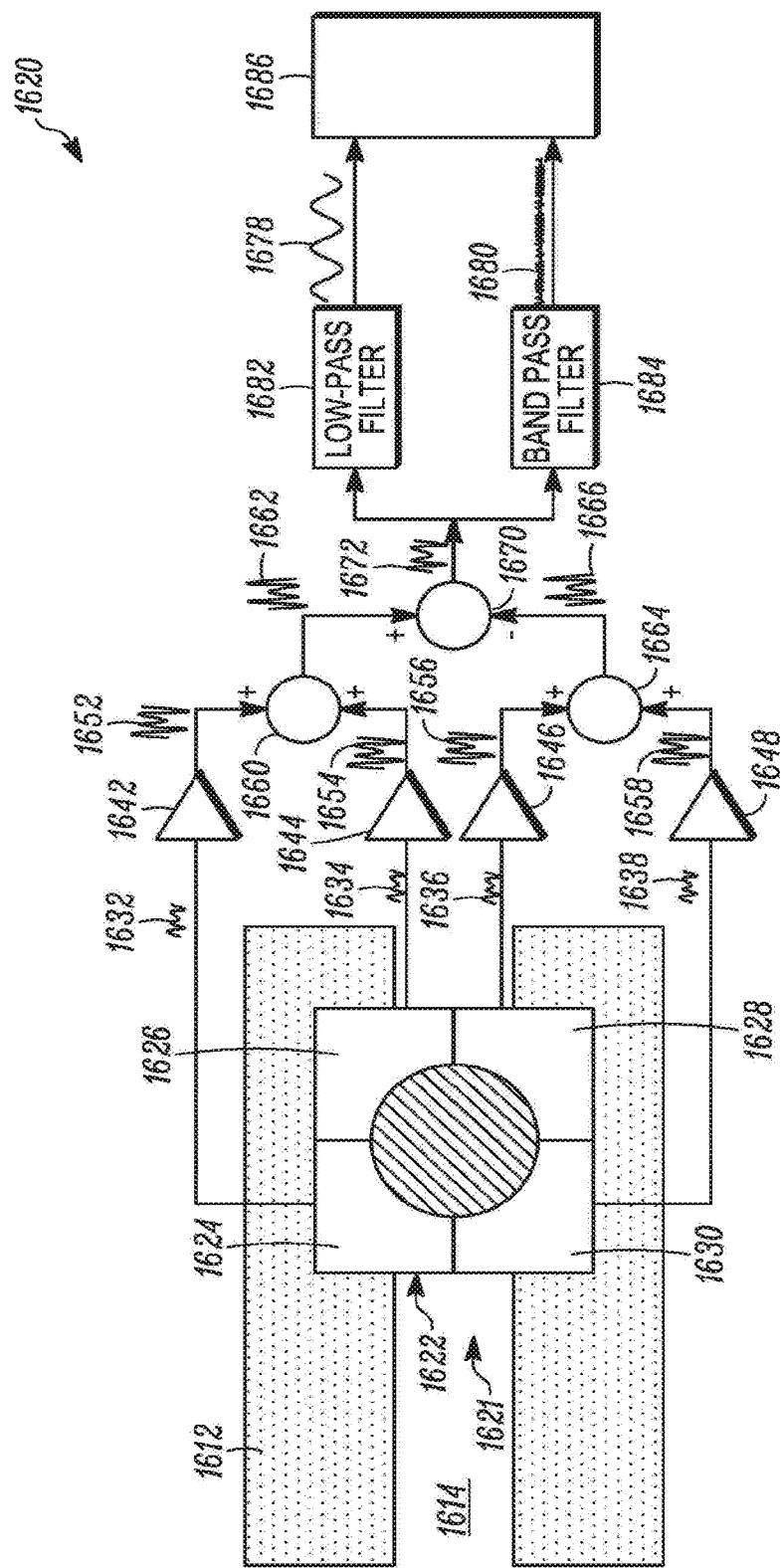
FIG. 16 illustrates a read head as part of a signal processing system for reading an optical recording medium.

FIG. 16 shows a signal processing system 1620 includes recording/reading head 1621. Recording/reading head 1621 includes quad photodetector 1622 which includes individual photodetectors 1624, 1626, 1628, and 1630. Signals 1632, 1634, 1636, 1638 from photodetectors 1624, 1626, 1628, 1630 are amplified by amplifiers 1642, 1644, 1646, 1648 to provide signals 1652, 1654, 1656, 1658. Signals 1652, 1654 are provided to adder 1660 which outputs summed signal 1662. Signals 1656, 1658 are provided to adder 1664 which outputs summed signal 1666. Summed signal 1662 and summed signal 1666 are inputted into subtractor circuit 1670 with outputs difference signal 1672 which is further processed to provide TES signal 1678 and wobble signal 1680. A low pass filter 1682 receives difference signal 1672 as an input and outputs TES signal 1678 while band pass filter 1684 receives difference signal 1672 and outputs wobble signal 1680. The wobble signal 1680 can be fed to the filters as described herein. The high frequency wobble signal includes, among other information, the key data track ID and Address codes, e.g., an index subfield (SF) and an address bits subfield (AF). Moreover, TES signal 1678 and wobble signal 1680 are used by recording/reading head servo system 1686 to provide positioning information regarding the position of head 1621. In particular, digital servo systems control the dynamic operation of the OPUs by using wobble signal information to place the OPU on the correct desired data track. Additional methods for detecting wobble signals and/or Tracking Error Signals are set forth in U.S. Pat. Nos. 5,383,169; 6,009,059; and 6,937,542; the entire disclosures of which are hereby incorporated by reference, however, if these disclosures conflict with the present application, the present application controls interpretation.

In the current optical tape methodologies, the multiple OPUs with multiple data recording zones on the media are utilized. In such systems, many analog-to-digital converters (ADC's) are needed to digitize the multiple wobble signals from multiple recording zones to be used by system Digital Signals Processors. Since there are significant numbers of wobble signals present in such system, the excessive cost, space utilization, power consumption, and high number of inputs and output associated there must be numerous ADCs or a methodology to use fewer ADC to output the wobble signals.

The present disclosure proposes a new and more efficient and robust wobble coding and decoding methodology and structures that would improve the detection of the sync pattern and its timing, therefore improving the robustness of the decoder and at the same time eliminating the need for the timing recovery fields, thus increasing the efficiency of the wobble address field. As described herein, the first filter provides a window in which the zero crossing can be detected by a second filter. This detection by the second filter sets the timing for the read/write operations on optical medium. The timing signal derived from the wobble pattern is set by first detecting the window and then the threshold crossing, which limits the threshold crossings for timing to the specific windows.

The processes, methods, or algorithms disclosed herein may be deliverable to implement by a processing device, controller, computer, which may include any existing programmable electronic control unit or dedicated electronic control unit, or circuitry. Similarly, the processes, methods, or algorithms may be stored as data and instructions executable by circuitry, a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms may also be implemented in a software executable object. Alternatively, the processes, methods, or algorithms may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components. It will be recognized that when software instructions are loaded into a controller, processor or circuitry, then such structures are specific, dedicated machines to execute the loaded instructions.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

Embodiments of the present disclosure can provide novel, efficient and robust wobble coding and decoding methods and structures to improve the detection of the sync pattern and its timing. The need for timing recovery fields can be reduced or eliminated.

What is claimed is:

1. A method for decoding a wobble pattern on an optical medium comprising: reading a wobble pattern signal on the optical medium, the wobble pattern signal stored in a wobble physical nanostructure track that is smaller than a land and groove structure of the optical medium, the wobble pattern signal representing address patterns for track addresses of the optical medium; applying a matched filter to the wobble pattern signal to generate a detection signal when the wobble pattern is detected by the matched filter, wherein applying the matched filter includes applying a sync sine matched filter to the wobble pattern signal; and detecting a threshold of the detection signal to indicate a beginning of an address field.

2. The method of claim 1, wherein reading the wobble pattern signal includes generating a signal including dual cycle wobble blocks.

3. The method of claim 2, wherein the dual cycle wobble blocks include a sync field and an address field following the sync field.

4. The method of claim 1, wherein the wobble pattern signal is free from a timing recovery signal.

5. The method of claim 1, wherein the sync sine matched filter includes taps with coefficients to match a desired wobble pattern.

6. The method of claim 1, wherein applying the matched filter includes applying a sync cosine matched filter to the wobble pattern signal to output a signal to a zero crossing detector and detecting a zero crossing threshold.

7. The method of claim 6, wherein the sync sine matched filter includes sine taps with coefficients to match a desired wobble pattern and wherein the sync cosine matched filter includes cosine taps with coefficients to match a desired wobble pattern such that the sync sine matched filter and the sync cosine matched filter provide precise timing of a sync timing with respect to an address bit pattern in the address field free of a timing recovery subfield.

8. The method of claim 1, wherein the wobble pattern includes a carrier frequency and wherein the matched filter is centered at the carrier frequency.

9. The method of claim 1, wherein the wobble pattern includes dual cycle phase shifted wobbles representing address index sub-fields and is free of a timing recovery sub-field.

10. The method of claim 1, wherein the wobble pattern includes dual cycle wobbles representing address bit sub-fields and being free of a timing recovery sub-field.

11. An optical tape data storage system comprising:
a tape head to read a wobble pattern signal on an optical tape; and
a decoder configured to receive the wobble pattern signal of the optical tape, and filter the wobble pattern signal using:
a sync sine matched filter to output a first detected signal that crosses a first threshold to identify a timing,
and a sync cosine filter to output a second detected signal that crosses a second threshold to further identify the timing without a timing recovery signal being present in the wobble pattern signal.

12. The system of claim 11, wherein the decoder is further configured to identify an address index and identify a predetermined pattern of bits trailing the address index.

13. The system of claim 11, wherein the sync sine matched filter operates by a plurality of taps executing an equation of $SSMF(n)=\Sigma_{x=0}^{39}a[x]W(n-x)$, where: $a=[-3\ -6\ -8\ -9.5\ -10\ -9.5\ -8\ -6\ -3\ 0\ 3\ 6\ 8\ 9.5\ 10\ 9.5\ 8\ 6\ 3\ 0\ 3\ 6\ 8\ 9.5\ 10\ 9.5\ 8\ 6\ 3\ 0\ -3\ -6\ -8\ -9.5\ -10\ -9.5\ -8\ -6\ -3\ 0]$, $W(n)$ is an input signal to the sync sine matched filter, $SSMF(n)$ is an output signal of the sync sine matched filter, and n is a sample index.

14. The system of claim 11, wherein the sync cosine matched filter operates by a plurality of taps executing an equation of $SCMF(n)=\Sigma_{x=0}^{39}a[x]W(n-x)$, where: $a=-[-9.5\ -8\ -6\ -3\ 0\ 3\ 6\ 8\ 9.5\ 10\ 9.5\ 8\ 6\ 3\ 0\ -3\ -6\ -8\ -9.5\ -10\ 10\ 9.5\ 8\ 6\ 3\ 0\ -3\ -6\ -8\ -9.5\ -10\ -9.5\ -8]$, $W(n)$ is an input signal to the sync cosine matched filter, $SCMF(n)$ is an output signal of the sync cosine matched filter, and n is a sample index.

15. The system of claim 11, wherein the tape head reads the wobble pattern signal off a wobble physical nanostructure track and data off a land and groove track, wherein the wobble physical nanostructure track is small compared to the land and groove track.

16. The system of claim 11, wherein the decoder is further configured to generate the wobble pattern signal including dual cycle wobble blocks, which include a sync field and an address field following the sync field.

17. An optical media encoding system, comprising
an encoder configured to write a wobble pattern signal to an optical tape with a dual pattern wobble signal that is matched to a sync sine matched filter to read a first detected signal that crosses a first threshold to identify a timing and matched to a sync cosine matched filter to read a second detected signal that crosses a second threshold.

18. The system of claim 17, wherein the wobble pattern signal is written to a wobble physical nanostructure track and data is written to a land and groove track, wherein the wobble physical nanostructure track is small compared to the land and groove track, and wherein the encoder is configured to generate the wobble pattern signal free of a timing recovery field and including dual cycle wobble blocks that include a sync field and an address field following the sync field.

\* \* \* \* \*

UNITED STATES PATENT AND TRADEMARK OFFICE
CERTIFICATE OF CORRECTION

PATENT NO. : 10,276,206 B2  
APPLICATION NO. : 15/268013  
DATED : April 30, 2019  
INVENTOR(S) : Mahnad Page 1 of 1

It is certified that error appears in the above-identified patent and that said Letters Patent is hereby corrected as shown below:

In the Specification

In Column 5, Line 7, delete "recoding" and insert -- recording --, therefor.

Signed and Sealed this  
Fourth Day of August, 2020

Andrei Iancu  
*Director of the United States Patent and Trademark Office*